J. M. GOODRIDGE.
TAG-FASTENER.
No. 6,781. Reissued Dec. 7, 1875.
FIG. I
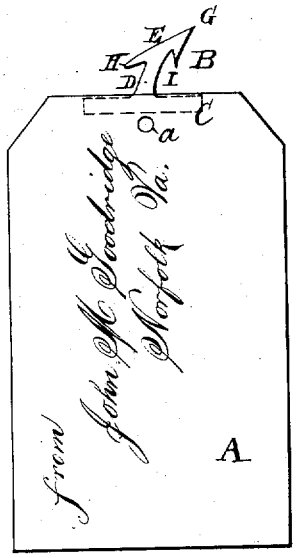
FIG. II
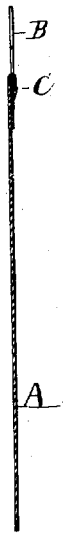
FIG. III
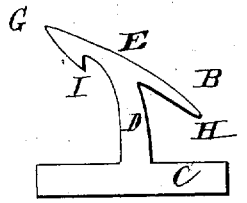
WITNESSES.
Theodore Mungen
H. A. Daniels
INVENTOR.
John M. Goodridge
by Alt. W. J. Howard
Atty.

UNITED STATES PATENT OFFICE.

JOHN M. GOODRIDGE, OF NORFOLK, VA., ASSIGNOR, BY MESNE ASSIGNMENTS, TO WILLIAM D. REYNOLDS, (TRUSTEE FOR MARY E. HUMPHREYS,) OF SAME PLACE, AND CHARLES HARVEY, OF BALTIMORE, MD.

IMPROVEMENT IN TAG-FASTENERS.

Specification forming part of Letters Patent No. 143,621, dated October 14, 1873; reissue No. 6,781, dated December 7, 1875; application filed October 6, 1875.

*To all whom it may concern:*

Be it known that I, JOHN M. GOODRIDGE, of Norfolk, in the county of Norfolk, State of Virginia, have invented certain Improvements in Tag-Fasteners, of which the following is a specification, reference being had to the accompanying drawing forming a part hereof.

This improvement relates to a tag or label combining in it means whereby it may be either hooked to bales, bundles, or other yielding articles to be marked, or attached by tying, pinning, or otherwise, to an object not susceptible of being pierced by the tag-hook, as hereinafter described.

Figure 1 is a side view of a tag or label provided with my improved barbed hook. Fig. 2 is an edge view of the same. Fig. 3 is a view of the hook detached.

Similar letters of reference indicate corresponding parts.

A is the label or card, upon which is written the direction, as seen in the drawing. This label may be made of paper or of any suitable material. B is the hook, which is made of flat sheet metal, the upper part of which is in the form of the letter T reversed. C is the cross of the T; D, the vertical bar, and E is the double-barbed hook at the end of the T. The point G is placed at an angle of about forty-five degrees with the bar D, and extends about an equal distance from the bar. The points G and H are smooth, and are readily inserted through a bag, bundle, or bale of goods; but on the point G there is a barb, I, which securely holds the hook in place when it is once attached. The hook is attached to the label by folding the latter over the cross C, as represented in Figs. 1 and 3. Below the cross C of the T is a perforation, *a*, through which a string or other means for fastening may be passed when it is desired to secure the tag to an object not suited to the attachment of the tag by means of the hook. The cross of the T prevents the tearing out of the hole.

The tag herein described, it is seen, provides a convenient article for mercantile uses, and prevents the need of two classes of labels.

What I claim as my invention, and wish to secure by Letters Patent of the United States, is—

1. A tag combined with the double barbed hook B, having its points placed at angles with the shank D, substantially as and for the purpose specified.

2. The combination of a hook having the cross-bar C, with a tag, A, the two being connected, as shown and described.

3. The combination of a tag perforated at *a* with a fastening-hook, having the cross-bar C, substantially as specified.

JOHN M. GOODRIDGE.

Witnesses:
WM. T. HOWARD,
DAVID HUMPHREYS.